US 7,831,865 B1
Nov. 9, 2010

(12) United States Patent
Sears

(10) Patent No.: US 7,831,865 B1
(45) Date of Patent: Nov. 9, 2010

(54) RESOURCE ALLOCATION FOR EXECUTING AUTOMATION SCRIPTS

(75) Inventor: Jimmy Dale Sears, Irving, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 456 days.

(21) Appl. No.: 11/861,918

(22) Filed: Sep. 26, 2007

(51) Int. Cl.
G06F 11/00 (2006.01)

(52) U.S. Cl. .......................... 714/38; 714/25; 714/26

(58) Field of Classification Search ............ 714/25, 714/26, 38
See application file for complete search history.

(56) References Cited

U.S. PATENT DOCUMENTS

| 5,634,098 | A  | * | 5/1997  | Janniro et al.        | 714/38  |
|-----------|----|---|---------|-----------------------|---------|
| 5,931,953 | A  | * | 8/1999  | Lesmeister            | 713/500 |
| 6,182,081 | B1 | * | 1/2001  | Dietl et al.          | 707/102 |
| 6,304,982 | B1 | * | 10/2001 | Mongan et al.         | 714/38  |
| 6,449,744 | B1 | * | 9/2002  | Hansen                | 714/738 |
| 6,662,312 | B1 | * | 12/2003 | Keller et al.         | 714/38  |
| 6,708,324 | B1 | * | 3/2004  | Solloway et al.       | 717/124 |
| 6,928,378 | B2 | * | 8/2005  | Lebee et al.          | 702/123 |
| 6,934,934 | B1 | * | 8/2005  | Osborne et al.        | 717/126 |
| 7,165,256 | B2 | * | 1/2007  | Boudnik et al.        | 718/104 |
| 7,188,044 | B1 | * | 3/2007  | Yegnashankaran et al. | 702/121 |
| 7,231,436 | B1 | * | 6/2007  | Dalfo et al.          | 709/223 |
| 7,296,190 | B2 | * | 11/2007 | Vakrat et al.         | 714/38  |
| 7,334,162 | B1 | * | 2/2008  | Vakrat et al.         | 714/38  |
| 7,373,415 | B1 | * | 5/2008  | DeShan et al.         | 709/231 |
| 7,389,453 | B2 | * | 6/2008  | Udell                 | 714/724 |
| 7,395,526 | B2 | * | 7/2008  | Arcand                | 717/127 |
| 7,543,188 | B2 | * | 6/2009  | Devas et al.          | 714/38  |
| 7,587,638 | B2 | * | 9/2009  | Shah et al.           | 714/38  |
| 2002/0138787 | A1 | * | 9/2002  | Pal et al.         | 714/38  |
| 2003/0098879 | A1 | * | 5/2003  | Mathews            | 345/762 |
| 2003/0131285 | A1 | * | 7/2003  | Beardsley et al.   | 714/38  |
| 2003/0196190 | A1 | * | 10/2003 | Ruffolo et al.     | 717/124 |
| 2003/0208351 | A1 | * | 11/2003 | Hartman et al.     | 703/22  |
| 2003/0217126 | A1 | * | 11/2003 | Polcha et al.      | 709/220 |
| 2003/0217308 | A1 | * | 11/2003 | Volkov             | 714/38  |
| 2004/0003068 | A1 | * | 1/2004  | Boldman et al.     | 709/223 |
| 2004/0268182 | A1 | * | 12/2004 | Liu et al.         | 714/38  |
| 2005/0081109 | A1 | * | 4/2005  | Czerwonka          | 714/38  |
| 2005/0114737 | A1 | * | 5/2005  | Hughes et al.      | 714/38  |
| 2006/0174162 | A1 | * | 8/2006  | Varadarajan et al. | 714/38  |
| 2006/0195725 | A1 | * | 8/2006  | Shah et al.        | 714/38  |
| 2006/0195839 | A1 | * | 8/2006  | Lin et al.         | 717/174 |
| 2007/0074078 | A1 | * | 3/2007  | Potts              | 714/38  |
| 2007/0094561 | A1 | * | 4/2007  | Udell et al.       | 714/738 |
| 2007/0150081 | A1 | * | 6/2007  | Nixon et al.       | 700/83  |
| 2007/0168789 | A1 | * | 7/2007  | Udell              | 714/724 |
| 2008/0010543 | A1 | * | 1/2008  | Yamamoto et al.    | 714/38  |

(Continued)

*Primary Examiner*—Bryce P Bonzo
*Assistant Examiner*—Joshua P Lottich

(57) ABSTRACT

Computer implemented methods and systems are provided for testing. A number of computers are configured for remote login. A number of test instances are identified. A test input file is partitioned into a number of segments, wherein the number of segments equals the number of test instances. A number of input files are created based on the number of segments, wherein the number of input files equals the number of segments. The number of test instances are executed on the number of computers to produce a number of test result files, wherein each test instance uses one of the input files. The number of test result files equals the number of test instances. The number of test result files are collated to produce a single combined test result file.

19 Claims, 3 Drawing Sheets

U.S. PATENT DOCUMENTS

| | | | |
|---|---|---|---|
| 2008/0216076 A1* | 9/2008 | Udell et al. | 718/100 |
| 2008/0244524 A1* | 10/2008 | Kelso | 717/124 |
| 2008/0320352 A1* | 12/2008 | Udell et al. | 714/739 |
| 2009/0070631 A1* | 3/2009 | Arora et al. | 714/38 |
| 2009/0070738 A1* | 3/2009 | Johnson | 717/106 |

* cited by examiner

RESOURCE ALLOCATION FOR EXECUTING AUTOMATION SCRIPTS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An enterprise may test a variety of computer applications, such as purchased or leased applications that have been developed externally, applications developed by the enterprise for internal use, and applications developed by the enterprise for external use. The enterprise may test the applications on test computers that are configured similarly to the computers that are expected to use the applications. Because thorough testing of an application may require time-consuming tests conducted using significant amounts of test data, application testers may use a testing tool to automate the testing process.

Application testers may write a test of an application using a scripting language that executes a series of commands that might otherwise have to be entered interactively through a keyboard at a command prompt. A scripting language may insulate application testers from the intricacies of more formal development and from usage of programming tools designed for application developers. A scripting language also may make it easy for an application tester with specific knowledge (an engineer, statistician, economist, etc.) to test a specified application.

An application tester may use a testing tool to input an application that is to be tested on a test computer and to also use an automatic testing script to launch or to execute the application under test. The testing tool may also allocate a test computer for the application and launch the application under test on the test computer by executing the automatic testing script. Such a testing tool may use an application program interface, such as a web portal, accessed through a user interface to test applications. Despite the automated testing offered by testing tools executing automation scripts to test applications, the process of testing applications still may be very time-consuming.

SUMMARY

Disclosed herein are computer implemented methods and systems for testing. In some method embodiments, a number of computers are configured for remote login. A number of test instances are identified. A test input file is partitioned into a number of segments, wherein the number of segments equals the number of test instances. A number of input files are created based on the number of segments, wherein the number of input files equals the number of segments. The number of test instances are executed on the number of computers to produce a number of test result files, wherein each test instance uses one of the input files. The number of test result files equals the number of test instances. The number of test result files are collated to produce a single combined test result file.

Some system embodiments include a number of computers and a testing tool. The computers are configured for remote login. The testing tool identifies a number of test instances, and partitions a test input file into a number of segments, wherein the number of segments equals the number of test instances. The testing tool also creates a number of input files based on the number of segments, wherein the number of input files equals the number of segments, and executes the number of test instances on the number of computers, wherein each test instance uses one of the input files. Additionally, the testing tool receives a number of test result files from the number of computers, wherein the number of test result files equals the number of test instances, and collates the number of test result files into a combined test result file.

In other method embodiments, a number of computers are configured for remote login. A number of test instances are identified of a first test. At least one instance is identified of a second test. A test input file is partitioned into a number of segments, wherein the number of segments equals the number of test instances. A number of input files are created based on the number of segments, wherein the number of input files equals the number of segments. A number of instances of the first test are executed, wherein each instance uses one of the input files, and where the number of instances of the first test is less than the number of test instances. The second test is executed in response to executing the number of instances of the first test. A number of remaining instances of the first test are executed in response to executing the second test wherein each remaining instance uses one of the input files. A number of test result files are collated from executing the first test to produce a combined test result file.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
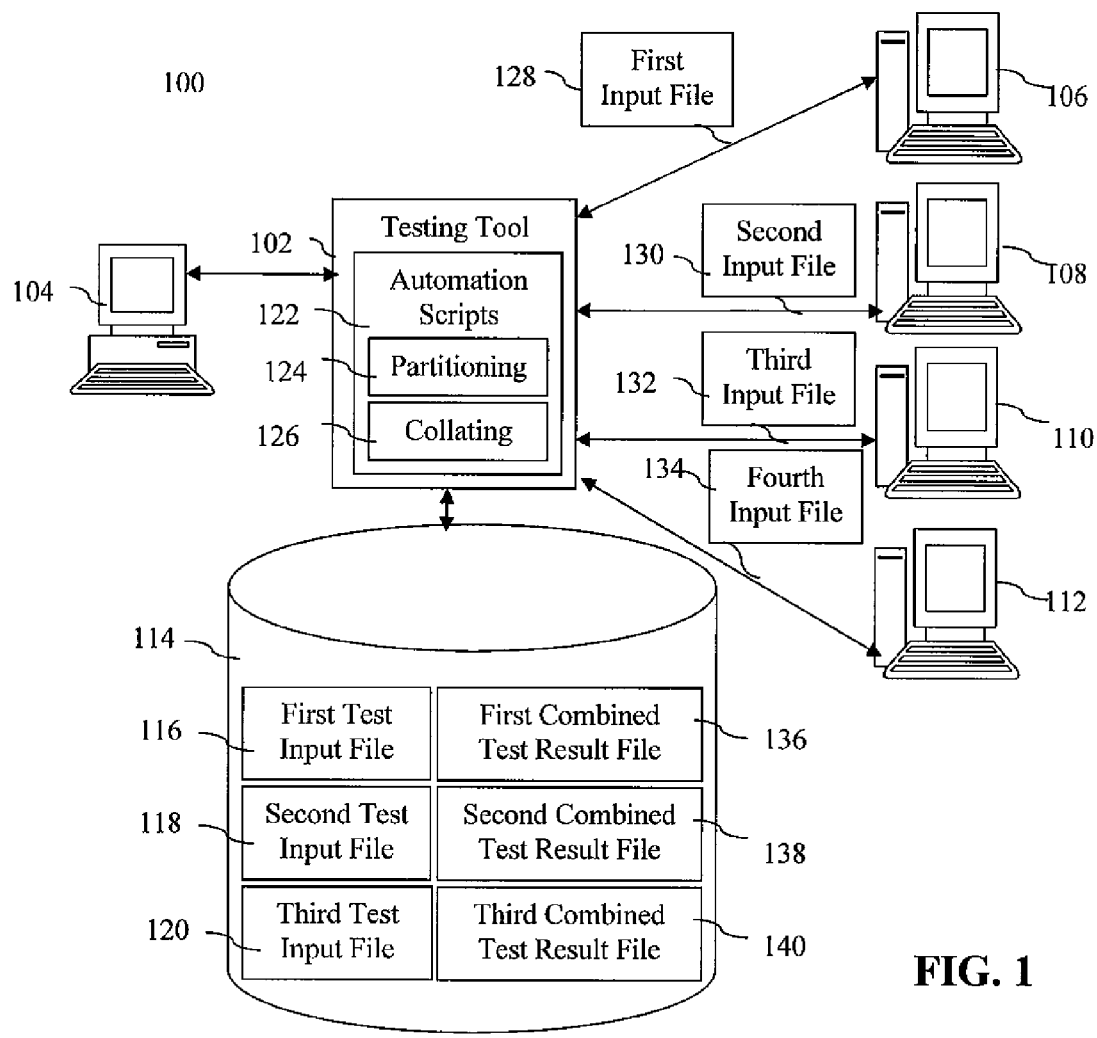
FIG. 1 shows a block diagram of a system for testing according to some embodiments of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In embodiments of the present disclosure, computer implemented methods and systems are provided for testing applications. An example of a test application framework is a Hewlett-Packard Mercury Loadrunner™ (Loadrunner™).

Because the Loadrunner™ is not set up to login to a test computer, the Loadrunner™ requires a user to login remotely to one test computer, which becomes the only test computer configured to test the user's application. Even though the Loadrunner™ may test an application on only one test computer at a time, the Loadrunner™ requires the configuration of each available test computer before the testing tool may test any application on any test computer. While certain shortcomings of prior systems may be used to better illustrate the present disclosure, the present disclosed system may not necessarily overcome all the shortcomings of these prior systems or have all the resulting advantages. Further, the present system discloses numerous additional aspects not found in these prior systems.

In embodiments of the present disclosure, a test application framework may use a testing tool that identifies an application to be tested and allocates a number of test computers for testing the application. Rather than requiring a user to login remotely to a test computer, the testing tool configures a number of computers for remote login, which enables the testing tool to allocate multiple computers for testing the application. For example, if ten test computers are available for testing applications, the testing tool may identify ten test instances of a billing application to be executed. The testing tool configures a number of test computers for executing a test instance of the application, and provides a test input file to each of the test instances. For example, the testing tool may partition a test input file of a spreadsheet containing 2,000 data rows into ten segments of 200 data rows apiece. The testing tool may create ten input files based on the ten segments. The testing tool invokes an automatic testing script for each test instance to test the application using the provided test input file. For example, the testing tool may execute ten test instances of the billing application using the ten input files. The testing tool may collate ten result files to produce a single combined test result file from executing the ten test instances of the billing application, which may have been executed ten times faster than the execution of the test input file of 2,000 data rows being executed on one test computer. The increase of execution speed may be critical for thorough testing of applications facing deadlines To the user, the test result file appears to have been produced by executing the application on one computer using all of the input data, a process which may have taken much longer and caused an application testing deadline to have been missed.

Instead of the testing tool allocating all of the available test computers for testing the billing application, the testing tool may allocate some of the available test computers for testing the billing application, thereby leaving the remainder of the test computers available for testing a collections application. The testing tool may begin testing an application on allocated test computers without requiring the available test computers to be configured for testing another application. Although this discussion describes testing a billing application and a collections application, the testing tool may be used to test any type or number of applications. The testing tool may also partition the test input file for the billing application into smaller segments so that the collections application has a shorter wait time before a test computer is available. For example, the testing tool may partition a test input file containing 2,000 data rows for the billing application into twenty segments of 100 data rows apiece even though only ten test computers are available. In this example, the collections application waits for the testing of any instance of the billing application using 100 data rows to complete, instead of waiting for any instance of the billing application to complete testing using 200 data rows. The test computer that completed testing of an instance of the billing application is available for testing the collections application even while other instances of the billing application are still executing on other test computers. Once the collections application begins testing on any test computer, then execution of the remainder of the test instances for the billing application may begin as previously executing test instances complete and test computers become available.

Turning now to FIG. 1, a block diagram of a system 100 for testing applications is shown according to some embodiments of the present disclosure. The numbers and types of each component in FIG. 1 are depicted for the purpose of an illustrative example only, as the system 100 can include any number and type of components. The system 100 includes a testing tool 102, a user interface 104, computers 106-112, and data storage 114. The testing tool 102 may be implemented by a general purpose computer, which is described in greater detail in reference to FIG. 3. Although some embodiments describe the testing tool 102 as electronically taking certain actions or processing certain data, in other embodiments these actions or activities may be accomplished manually, such as by a user requesting testing of an application. In other embodiments, these actions may be accomplished partially by hand and partially by the computer. The testing tool 102 may include an application program interface, such as a web portal, that may be accessed via the user interface 104. The computers 106-112 may be located in a secure environment to reduce the possibility of computer users or other applications affecting test results. An application to be tested may be installed on the computers 106-112, or the computers 106-112 may use a uniform resource locater (URL) to reference, via a communications network, the application to be tested. The data storage 114 includes test input files 116-120. Each of the test input files 116-120 includes data for testing a corresponding application.

The testing tool 102 may execute automation scripts 122 to automatically test applications on the computers 106-112. The automation scripts 122 may be input via the user interface 104 for each of the applications to be tested. The automation scripts 122 may include partitioning 124 automation scripts and collating 126 automation scripts. The testing tool 102 uses the partitioning 124 automation scripts to partition the test input files 116-120 into smaller segments of data used for testing applications, and to create input files based on the segments, such as input files 128-134.

The testing tool 102 tests an application by partitioning a test input file into a number of segments, creating a number of input files 128-134 based on the segments, and executing automation scripts 122 to test the application on the computers 106-112 using the input files 128-134. The testing tool 102 executes test instances of the application on the computers 106-112 using the input files 128-134 and the automation scripts 122 to run commands, for example, as if a user were entering data into the application. After testing is executed, the testing tool 102 uses the collating 126 automation scripts to collate the results from the application using the input files 128-134 into one of the combined test result files 136-140. By executing the automation scripts 122 on each of the test instances, the testing tool 102 produces a result file for each of the test instances based on using one of the input files 128-134. Each result file may contain results information including one or more of lists of what was tested, whether any errors occurred, data that was read, data that was written, back-office data, remote commands, communications with other systems, and similar testing information. The testing tool 102 collates the result file from each test instance to generate a combined test result file that combines the test results from executing each of the test instances based on using the input files 128-134. The testing information listed in the generated test result file appears to the user as if the application was tested on only one test computer using one large input file that includes all of the input files 128-134.

For example, to test a billing application, the testing tool 102 partitions the first test input file 116 into four segments, creates four input files 128-134 based on the four segments, and executes automation scripts 122 to test based on the four input files 128-134 on the four computers 106-112. If the testing tool 102 allocates less than all of the computers 106-112 for testing a specific application, the testing tool 102 leaves the remainder of the computers 106-112 for other users. Continuing this example, after testing is executed, the testing tool 102 uses the collating 126 automation scripts to collate the results from executing the four input files 128-134 into the first combined test result file 136. The number of partitioned segments and the corresponding number of input files 128-134 in FIG. 1 are depicted for illustrative examples only, as the testing tool 102 may partition a test input file into any number of segments, create any number of input files 128-134, and collate any number of result files.

Figure 2:
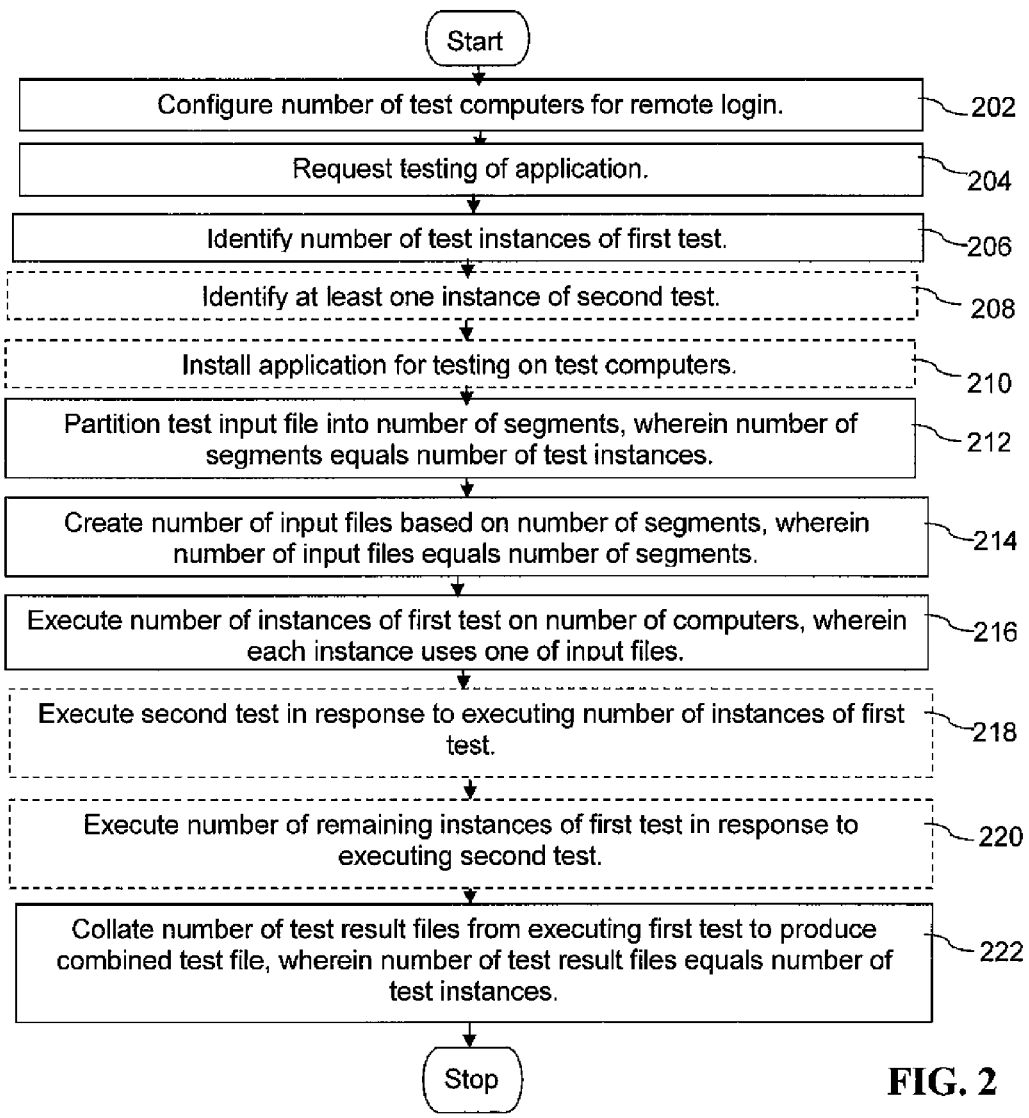
FIG. 2 shows a flowchart of a method for testing applications according to some embodiments of the present disclosure.

FIG. 2 shows a flowchart of a method for testing according to some embodiments of the present disclosure. The testing tool 102 may execute the method to allocate computers for automatically testing an application, to partition a test input file into segments, to test the application, and to combine the results from the computers testing the application into a result file.

In box 202, a number of the computers 106-112 are configured for remote login. For example, the testing tool 102 configures the computers 106-112 at a secure environment for remote login. The testing tool 102 identifies that four computers 106-112 are available for testing applications and creates a local user identification (ID). The testing tool 102 updates a registry for each of the computers 106-112 to allow auto login based on the local user ID and configures each of the computers 106-112 to automatically login. The testing tool 102 disables a screen saver for each computer to prevent each of the computers 106-112 from locking, and configures each of the computers 106-112 to accept requests to execute automation scripts. The testing tool 102 executes this remote login configuration process to enable users of the testing tool 102 to access the computers 106-112 located in the secure environment without the need for the user to configure and remotely login to each of the computers 106-112 individually. By configuring all of the computers 106-112 in advance, the testing tool 102 makes any number of the computers 106-112 readily available for testing a specific application based on any requirements for testing the specific application.

In box 204, testing of an application is requested. For example, a user inputs a request via the user interface 104 to the testing tool 102 for testing of a billing application, for example, by entering arguments into a command line of the user interface 104. The arguments may identify the application to be tested and a test input file that corresponds to the application.

In box 206, a number of test instances are identified. For example, the testing tool 102 identifies four test instances for the billing application by identifying all four of the computers 106-112 that are available for executing a test instance. The testing tool 102 identifies the first available computers for executing a test instance, such as first identifying the computer 106, next identifying the computer 108, then identifying the computer 110, and finally identifying the computer 112. The testing tool 102 may identify four test instances, which equals the number of computers 106-112, so that use of the computers 106-112 is optimized for testing the billing application. In another example, the testing tool 102 identifies only three test instances, which is less than the number of computers 106-112 available for testing. The testing tool 102 may identify only three of the four available computers 106-112 for testing the billing application so that one of the computers 106-112, such as the computer 112, is allocated for another use, such as testing a collections application. The testing tool 102 may be dynamically modified on a test by test basis to determine whether to reserve some of the computers 106-112 for other uses or to optimize the number of the computers 106-112 used for testing the current application to be tested.

In box 208, at least one instance of a second test is optionally identified. For example, the testing tool 102 identifies one instance of a test for the collections application. In the collections application example, the testing tool 102 may balance the needs of the user that first requested the testing of the billing application using a large input file with the needs of another user that later requested the testing of the collections application using a small input file. The testing tool 102 may balance the needs of both users by first scheduling some of the instances for the testing using the large input file that was requested first, and then scheduling the later-requested testing using the short input file into the testing schedule before the testing of the billings application is completed with the large input file. The flexible scheduling offered by the testing tool 102 may insure that the testing of the billings application with the large input file does not consume all of the testing resources for a substantial period of time while the collections application that requires only a test with a small input file has to wait idle.

In box 210, an application for testing is optionally installed on computers. For example, the testing tool 102 installs the billing application on the computers 106-112. In another example, the testing tool 102 installs the billing application on the computers 106-110, leaving the computer 112 available for testing other applications. Because the test instance for the collections application may be executed through an interface on any of the test computers 106-112, the collections application may not need to be installed on any of the computers 106-112. For this example, the collections application may be executed by instructing any of the computers 106-112 to access a web page via a communications network, where the webpage includes the URL for the collections application. Each test instance, whether resident on a test computer or executed through an interface, includes at least one test for a corresponding application.

In box 212, a test input file is partitioned into a number of segments, wherein the number of segments equals the number of test instances. Rather than waiting a long time for one test instance to execute using the entire test input file, a number of test instances may execute smaller portions of the test input file in significantly less time. For example, the testing tool 102 partitions the first test input file 116, corresponding to the billing application, into four segments. The number of segments equals the number of test instances, which may be equal to the number of computers 106-112 allocated for testing the billing application. The number of segments equals the number of test instances because each test instance requires the use of at least a portion of the test input file to execute. The testing tool 102 partitions the first test input file 116 into four segments by reading the first test input file 116, counting a number of data rows in the first test input file 116, and dividing the number of data rows by the number of test instances. For example, the first input test file 116 is a spreadsheet for the billing application, and the spreadsheet includes 2,800 data rows. The testing tool 102 divides the 2,800 data rows by the four test instances to produce a preliminary 700.0 data rows per test instance. If the preliminary number of data rows is not an integer, the testing tool 102 may round the number of data rows per test instance to the next integer. As is well known, a variety of techniques are available for rounding numbers composed of a fractional part to an integer. Rounding may round any number composed of a fractional part up to the nearest integer, down to the nearest integer. Rounding may round up to the nearest integer if the fractional portion of the composed number is one half or greater and round down if the fractional portion of the composed number is less than half. Yet other rounding schemes may be employed, all of which are contemplated by the present disclosure. Rounding may also be referred to as approximating. In such a situation, the number of data rows may be one integer higher for some of the test instances than for some of the other test instances. Alternatively, the testing tool 102 may partition the first test input file 116 in other ways that do not attempt to create segments of approximately the same size. In this example, the testing tool 102 allocates 700 data rows per test instance to each segment for the billing application.

In another example, the testing tool 102 does not partition the second test input file 118, which corresponds to the collections application, into segments because the second test input file 118 is a spreadsheet that includes only 20 data rows, which may be less than the minimum number of data rows required for partitioning any of the test input files 116-120 into segments. The minimum number of data rows required for partitioning a test input file may be based on consumption of resources. For example, the time required for partitioning 20 data rows into 4 segments of 5 data rows apiece, creating 4 input files based on the 4 segments, and collating the 4 test result files from executing 4 instances, each using 5 data rows, may be greater than the time required for executing one test instance using 20 data rows.

In box 214, a number of input files 128-134 are created based on the number of segments, wherein the number of input files 128-134 equals the number of segments. For example, the testing tool 102 creates the four input files 128-134 for the billing application, with each of the input files 128-134 based on one of the four segments that include 700 data rows apiece. In another example, the testing tool 102 creates one additional input file for the collections application, with the additional input file based on the second test input file 118 of 20 data rows.

In box 216, the number of test instances is executed wherein each test instance uses one of the input files. For example, the testing tool 102 executes the four test instances for the billing application by executing the automation scripts 122. Alternatively, the testing tool 102 executes a number of instances of the test for the billing application, where the number of instances of the test executing for the billing application is less than the total number of test instances for the billing application. For example, the testing tool 102 executes three instances of the test for the billing application, out of the four possible test instances for the billing application, on three of the computers 106-110. By executing only a limited number of test instances for the billing application, the testing tool 102 is allocating the computer 112 for testing the collections application instead of allocating all of the computers 106-112 for testing the billing application. After the short time required for executing the collections application is completed, the remaining test instance for the billing application may be executed on the computer 112. In this example, the collections application is executed without waiting for execution of the test instances for the billing application even though testing of the billing application was requested before testing of the collections application was requested. Three of the instances of the billing application are executed without waiting, while the fourth instance of the billing application is executed after waiting for the short time required for executing the collections application.

If the testing tool 102 allocates the computers 106-112 after the testing of the billing application is requested, but before the testing of the collections application is requested, the testing tool 102 may allocate all four of the computers 106-112 for testing the billing application. In this situation, testing of the collections application must wait until one of the computers 106-112 has completed execution of a test instance of the billing application using 700 data rows. In this example, due to the sequence of the testing requests, a late arriving request to test 20 data rows must wait on one of the computers 106-112 to complete testing using 700 data rows.

Some embodiments address this sequencing situation by identifying a number of test instances for the billing application that is greater than the number of computers. The increased number of test instances results in partitioning the test input file into an increased number of segments, which results in increasing the corresponding number of input files. Because the test input file is being partitioned into a greater number of input files than in the previous example, each input file is reduced in size compared to the previous example. Subsequently, testing an instance using an input file requires reduced execution time, which enables later requests for testing of applications to be addressed without waiting for every instance associated with the earlier request to execute.

For example, rather than partitioning the first test input file 116 for the billing application into four segments and creating four input files to execute on the four computers 106-112, the testing tool 102 partitions the first test input file 116 for the billing application into seven segments and creates seven input files to execute on the four computers 106-112. The 2,800 data rows in the first test input file 116 are partitioned into seven segments of 400 data rows apiece, which results in creating seven input files of 400 data rows apiece. The creation of four input files for the billing application would have resulted in the later request for testing the collections application to wait for one of the computers 106-112 to execute a test on 700 data rows. In contrast, the creation of seven input files for the billing application results in the late arriving collection application and the three remaining instances of the billing application collectively waiting for the four computers 106-112 to execute a test on only 400 data rows for each of the first four instances of the billing application. This type of partitioning results in less waiting time for the testing of subsequent applications and instances.

In box 218, the second test is optionally executed in response to executing the number of instances of the first test. For example, having begun execution of the three instances of the test for the billing application on the computers 106-110, the testing tool 102 executes the test for the collections application on the remaining computer 112. In this example, the test on the 20 data rows for the collections application does not have to wait until the test on the 700 data rows for the billing application is completed on each of the computers 106-112. In the example based on seven input files, having completed execution of one of the first four instances of the test for the billing application using 400 data rows on one of the computers 106-112, the testing tool 102 executes the test for the collections application. In this example, the test on the 20 data rows for the collections application waits until execution is completed using only 400 data rows, not 700 data rows, for the billing application on one of the computers 106-112.

In box 220, a number of remaining instances of the first test are optionally executed in response to executing the second test. For example, when executing the test for the collections application on the remaining computer 112 is completed, the testing tool 102 executes the one remaining instance of the test of the billing application on the remaining computer 112. In this example, the test on the 20 data rows for the collections application may be completed relatively quickly, such that the remaining instance of the test for the billing application that has not already begun execution does not have to wait long before it is allocated to the remaining computer 112. In the example based on seven input files, the testing tool 102 has completed execution of some of the first four instances of the test for the billing application and begun execution of the test for the collections application. As execution of some of the first four instances of the test for the billing application is completed such that some of the computers 106-112 become available, the testing tool 102 begins executing the test for some of the three remaining instances of the billings application.

In box 222, a number of test result files are collated from executing the number of test instances to produce a combined test result file, wherein the number of test result files equals the number of test instances. For example, the testing tool 102 uses the collating 126 automation scripts to produce the first combined test result file 136 from executing the four test instances for the billing application on the computers 106-112. In this example, the four computers 106-112 may execute the test for the billing application on all of the data rows in the first test input file 116 approximately four times faster than the test would have been executed using only one of the computers 106-112. The user of the testing tool 102 may use the user interface 104 to access the first combined test result file 136, which displays the result data as if the test had been executed on only one of the computers 106-112. The number of the computers 106-112 used to test the application is transparent to the user.

Figure 3:
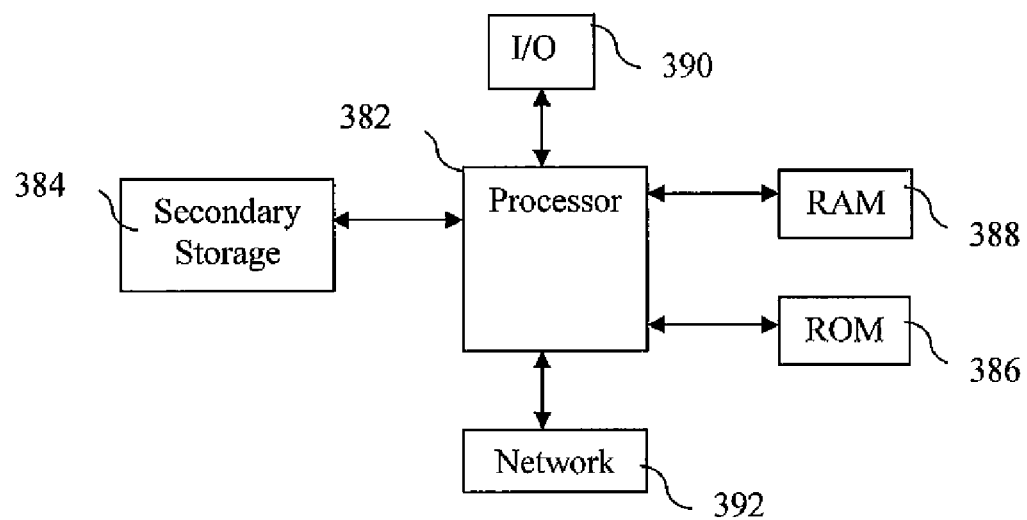
FIG. 3 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computer implemented method for testing, comprising:
   configuring a number of computers for remote login;
   identifying a number of test instances;
   partitioning a test input file into a number of segments, wherein the number of segments equals the number of test instances and wherein partitioning the test input file into the number of segments comprises:
reading the test input file;
counting a number of data rows in the test input file;
dividing the number of data rows by the number of test instances to produce a preliminary number of data rows per test instance;
rounding the number of data rows per test instance to the next integer to produce a final number of data rows per test instance; and
allocating the number of final data rows per test instance to each segment;
creating a number of input files based on the number of segments, wherein the number of input files equals the number of segments;
executing the number of test instances to generate a number of test result files on the number of computers, wherein the number of test result files equals the number of test instances, wherein each test instance uses one of the input files and produces one of the test result files; and
collating the number of test result files to produce a combined test result file.

2. The computer implemented method of claim 1 wherein configuring the number of computers for remote login comprises:
identifying the computers;
creating a local user identification;
updating a registry for each computer to allow auto login based on the local user identification;
configuring each computer to automatically login;
disabling a screen saver for each computer to prevent each computer from locking; and
configuring each computer to accept requests to execute automation scripts.

3. The computer implemented method of claim 1 wherein the computers are in a secure environment.

4. The computer implemented method of claim 1 further comprising requesting testing of an application.

5. The computer implemented method of claim 1 further comprising installing an application for testing on computers.

6. The computer implemented method of claim 1 wherein each test instance references a uniform resource locator.

7. The computer implemented method of claim 1 wherein identifying the number of test instances comprises identifying a number of computers that are available for executing a test instance.

8. The computer implemented method of claim 1 wherein each test instance comprises at least one test for an application.

9. The computer implemented method of claim 1 wherein the number of test instances equals the number of computers so that use of the computers is optimized.

10. The computer implemented method of claim 1 wherein the number of test instances is less than the number of computers so that at least one of the computers is allocated for an other use.

11. The computer implemented method of claim 1 wherein the test input file is a spreadsheet.

12. The computer implemented method of claim 1 wherein executing the number of test instances comprises executing automation scripts.

13. A system for testing, comprising:
a number of computers, each computer configured for remote login; and
a testing tool configured to identify a number of test instances, to partition a test input file into a number of segments, wherein the number of segments equals the number of test instances and wherein to partition the test input file into the number of segments comprises to read the test input file, to count a number of data rows in the test input file, to divide the number of data rows by the number of test instances to produce a preliminary number of data rows per test instance, to round the number of data rows per test instance to the next integer to produce a final number of data rows per test instance, and to allocate the final number of data rows per test instance to each segment, to create a number of input files based on the number of segments, wherein the number of input files equals the number of segments, to execute the number of test instances on the number of computers, wherein each test instance uses one of the input files, to receive a number of test result files from the number of computers, wherein the number of test result files equals the number of test instances, and to collate the number of test result files into a combined test result file.

14. The system of claim 13 wherein the testing tool is further configured to identify a first available computer for executing a test instance.

15. The system of claim 13 wherein the testing tool comprises an application program interface.

16. The system of claim 13 wherein the testing tool comprises a web portal.

17. A computer implemented method for testing, comprising:
configuring a number of computers for remote login;
identifying a number of test instances of a first test;
identifying at least one instance of a second test;
partitioning a test input file into a number of segments, wherein the number of segments equals the number of test instances;
creating a number of input files based on the number of segments, wherein the number of input files equals the number of segments;
executing a number of instances of the first test, wherein each instance of the first test uses one of the input files, where the number of instances of the first test is less than the number of test instances;
executing the second test in response to executing the number of instances of the first test;
executing a number of remaining instances of the first test in response to executing the second test, wherein each remaining instance uses one of the input files; and
collating a number of test result files from executing the first test to produce a combined test result file.

18. The computer implemented method of claim 17 wherein the number of test instances of the first test is greater than the number of computers, thereby increasing the number of input files, wherein each input file is reduced in size so that executing each instance of the first test using one of the input files requires reduced execution time, which enables earlier execution of the second test in response to executing the number of instances of the first test.

19. The computer implemented method of claim 17 wherein executing the number of instances of the first test uses fewer computers than the number of computers so that at least one of the computers is allocated for an other use.

* * * * *